US011348372B2

(12) United States Patent
Kimura et al.

(10) Patent No.: US 11,348,372 B2
(45) Date of Patent: May 31, 2022

(54) SECURITY MANAGEMENT SYSTEM

(71) Applicant: KIMURA CORPORATION, Tokyo (JP)

(72) Inventors: Tomoei Kimura, Tokyo (JP); Chisato Kanamori, Tokyo (JP); Minghan Gu, Tokyo (JP)

(73) Assignee: KIMURA CORPORATION, Tokyo (JP)

(*) Notice: Subject to any disclaimer, the term of this patent is extended or adjusted under 35 U.S.C. 154(b) by 0 days.

(21) Appl. No.: 16/636,285

(22) PCT Filed: Aug. 2, 2018

(86) PCT No.: PCT/JP2018/029065
§ 371 (c)(1),
(2) Date: Feb. 3, 2020

(87) PCT Pub. No.: WO2019/027007
PCT Pub. Date: Feb. 7, 2019

(65) Prior Publication Data
US 2021/0166005 A1 Jun. 3, 2021

(30) Foreign Application Priority Data

Aug. 2, 2017 (JP) .................. JP2017-150177

(51) Int. Cl.
G06K 9/00 (2022.01)
H04N 7/18 (2006.01)
(Continued)

(52) U.S. Cl.
CPC .............. G06V 40/20 (2022.01); G06V 10/44 (2022.01); G06V 20/52 (2022.01); G08B 13/19613 (2013.01); H04N 7/18 (2013.01)

(58) Field of Classification Search
USPC ....... 382/100, 103, 106–107, 123, 162, 168, 382/173, 181, 199, 209, 219, 220, 254,
(Continued)

(56) References Cited

U.S. PATENT DOCUMENTS 6,504,482 B1 * 1/2003 Mori .................... G08B 21/043
340/573.1
8,159,537 B2 4/2012 Itoh et al.
(Continued)

FOREIGN PATENT DOCUMENTS

EP 2 161 695 3/2010
JP H06174450 6/1994
(Continued)

OTHER PUBLICATIONS

Extended European Search Report dated Mar. 15, 2021 in Application No. 18840480.0.
(Continued)

Primary Examiner — Seyed H Azarian
(74) Attorney, Agent, or Firm — Knobbe, Martens, Olson & Bear, LLP

(57) ABSTRACT

The present invention provides a technology which performs security management while ensuring privacy of a user. The present invention is provided with: an image-capturing device which captures an image of the inside of a target booth such as a toilet booth, a shower booth, and a dressing room; an abnormality determination means which determines abnormality in the target booth on the basis of the image captured by the image-capturing device; a notification data generation means which generates notification data on the basis of the abnormality determination result; and an abnormality notification means which provides a notification of the notification data.

2 Claims, 16 Drawing Sheets

(51) Int. Cl.
*G06V 40/20* (2022.01)
*G08B 13/196* (2006.01)
*G06V 10/44* (2022.01)
*G06V 20/52* (2022.01)

(58) Field of Classification Search
USPC ............... 382/274, 276, 286–291, 305, 321; 340/529; 348/143, 142, 144; 715/700
See application file for complete search history.

(56) References Cited

U.S. PATENT DOCUMENTS

| | | | | |
|---|---|---|---|---|
| 2008/0256445 | A1* | 10/2008 | Olch | G16H 40/67 715/700 |
| 2009/0262195 | A1 | 10/2009 | Yoshida et al. | |
| 2011/0025847 | A1* | 2/2011 | Park | H04N 7/181 348/143 |
| 2012/0250944 | A1* | 10/2012 | Yamamoto | G06T 7/30 382/103 |
| 2019/0272727 | A1* | 9/2019 | Yang | G08B 21/043 |

FOREIGN PATENT DOCUMENTS

| | | |
|---|---|---|
| JP | 2002-199470 A | 7/2002 |
| JP | WO 2006/132029 | 12/2006 |
| JP | 2007-193558 A | 8/2007 |
| JP | 2007300531 | 11/2007 |
| JP | 2011049646 | 3/2011 |
| JP | 2011141732 | 7/2011 |
| JP | 2011-209860 A | 10/2011 |
| JP | 4859879 | 1/2012 |
| JP | 2015087882 | 5/2015 |
| JP | 2015138427 | 7/2015 |
| JP | 2016-067641 A | 5/2016 |
| JP | 2017004320 | 1/2017 |

OTHER PUBLICATIONS

International Search Report issued in International Application No. PCT/JP2018/029065 dated Sep. 11, 2018, in 1 page.

Office Action issued in the Japanese counterpart Patent Application No. 2017-150177, dated Apr. 5, 2022, in 9 pages with English machine translation.

* cited by examiner

SECURITY MANAGEMENT SYSTEM

CROSS-REFERENCE TO RELATED APPLICATIONS

This application is a U.S. national phase of International Patent Application No. PCT/JP2018/029065 filed on Aug. 2, 2018, which claims the benefit of Japanese Patent Application No. 2017-150177 filed on Aug. 2, 2017, the entire contents of each of which are incorporated herein by reference.

BACKGROUND

The present invention relates to a security management system.

In places used by many and unspecified people, such as stations and airports, it is preferable that surveillance be conducted to find leaving of suspicious objects and when a suspicious object is placed, such an object can be quickly found and removed.

To this end, a surveillance apparatus is provided that picks up images of a space under surveillance by using a surveillance camera and identifies a suspicious object from the surveillance images (Patent document 1).

CITATION LIST

Patent Document

[Patent document 1] Japanese Patent Laid-Open No. 2011-49646
[Patent document 2] Japanese Patent Laid-Open No. 2015-87882
[Patent document 3] Japanese Patent No. 4859879

SUMMARY

Surveillance can be conducted by installing surveillance cameras in public spaces such platforms of stations and lobbies of airports. However, a surveillance camera cannot be installed in a booth that is used in a closed state so that a user is not seen by a third party (hereinafter, also referred to as a target booth), such as a toilet booth, a changeroom, or a shower room, in order to ensure privacy, and it is therefore difficult to detect a suspicious object left behind in the target booth. Similarly, if an amenity is removed or damaged within a target booth, it is difficult to detect such occurrence. That is, in a target booth, it is difficult to build a system that detects abnormal affairs such as leaving of a suspicious object, removing of an amenity, and damaging of an amenity.

Accordingly, an object of the present invention is to provide a technology that performs security management while ensuring user privacy.

To solve the problems, a security management system according to the present invention includes: an image pickup apparatus that picks up an image of an inside of a target booth; an abnormality determination unit that determines an abnormality within the target booth, based on the picked-up image picked up by the image pickup apparatus; a notification data generation unit that generates notification data, based on a result of determination of the abnormality; and an abnormality notification unit that notifies the notification data.

In the security management system, the abnormality determination unit may detect a user who uses the target booth from the picked-up image, and may determine the abnormality based on an action of the user.

In the security management system, when the abnormality is detected, the notification data generation unit may generate, as the notification data, an image obtained by extracting an outline from the picked-up image.

In the security management system, the abnormality determination unit may detect entering of the user into the target booth or exiting of the user from the target booth, based on the action of the user.

In the security management system, the abnormality determination unit may determine the abnormality by comparing an image picked up before entering of the user with an image picked up after exiting of the user.

To solve the problems, in a security management method according to the present invention, a computer performs: picking up an image of an inside of a target booth by using an image pickup apparatus; determining an abnormality within the target booth, based on the picked-up image picked up by using the image pickup apparatus; generating notification data, based on a result of determination of the abnormality; and notifying the notification data.

In the security management method, a user who uses the target booth may be detected from the picked-up image, and the abnormality may be determined based on an action of the user.

In the security management method, when the abnormality is detected, an image obtained by extracting an outline from the picked-up image may be generated as the notification data.

In the security management method, entering of the user into the target booth or exiting of the user from the target booth may be detected based on the action of the user.

In the security management method, the abnormality may be determined by comparing an image picked up before entering of the user with an image picked up after exiting of the user.

The present invention may be a security management program for causing a computer to execute the security management method. The security management program may be stored in a computer-readable storage medium.

Here, the computer-readable storage medium refers to a storage medium which stores information such as data and a program through electrical, magnetic, optical, mechanical, or chemical action and from which the information can be read by a computer. Among such storage media, storage media that are removable from a computer include, for example, a flexible disk, a magneto-optical disk, a CD-ROM, a CD-R/W, a DVD(R), a DAT, an 8 mm tape, a tape, a memory card, and the like. Storage media that are fixed to a computer include a hard disk, a ROM (read only memory), and the like.

According to the present invention, it is possible to provide a technology that performs security management while ensuring user privacy.

DETAILED DESCRIPTION

First Embodiment

Hereinafter, embodiments of the present invention will be described based on drawings. Note that the embodiments are examples of the present invention, and configurations of the present invention are not limited to the examples described below.

Figure 1:
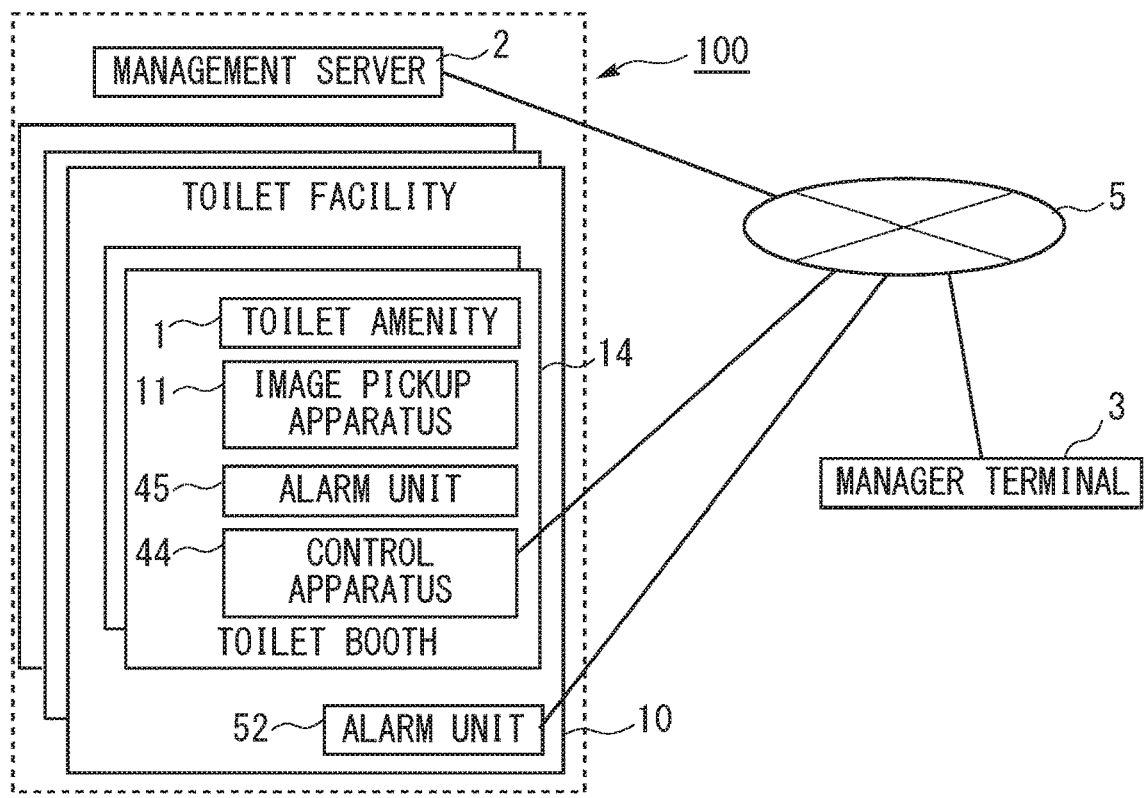
FIG. 1 illustrates a configuration of a security management system.

FIG. 1 illustrates a configuration of a security management system 100 according the first embodiment. The security management system 100 according to the present embodiment includes an image pickup apparatus 11, a control apparatus 44, an alarm unit 45, and a management server 2, which are connected via a network 5 such as the Internet or a LAN (Local Area Network). The security management system 100 has a toilet booth (toilet stall) 14 provided in a toilet facility 10 as a management-target booth and, when an abnormality occurs in the toilet booth 14, such as when a user exits leaving behind a left-behind object, when a user damages a toilet amenity, when a user removes a toilet amenity, or when a user falls within the toilet booth, outputs notification data indicating occurrence of the abnormality. The security management system 100 notifies information notifying the abnormality (abnormality notification information) to a predetermined notification destination, for example, a manager terminal 3 used by a manager that manages the toilet facility. Note that although FIG. 1 illustrates an example in which the security management system 100 does not include the manager terminal 3, the security management system 100 may include the manager terminal 3.

The toilet facility 10 is, for example, a public toilet used by many and unspecified users (the general public) in commercial facilities such as department stores, stations, and the like, and is provided in each of a plurality of buildings or on each of a plurality of floors in each building. The toilet facility 10 according to the present embodiment includes a plurality of the toilet booths 14, and each toilet booth 14 includes the control apparatus 44 and the alarm unit 45. The control apparatus 44 determines an abnormality in the toilet booth 14 and generates notification data indicating the abnormality. The alarm unit 45, 52 lets a user in the toilet facility know occurrence of the abnormality by blinking an alarm light, outputting an alarm sound or an audio message, or the like, based on abnormality notification information notified from the control apparatus 44 or the management server 2.

Figure 2:
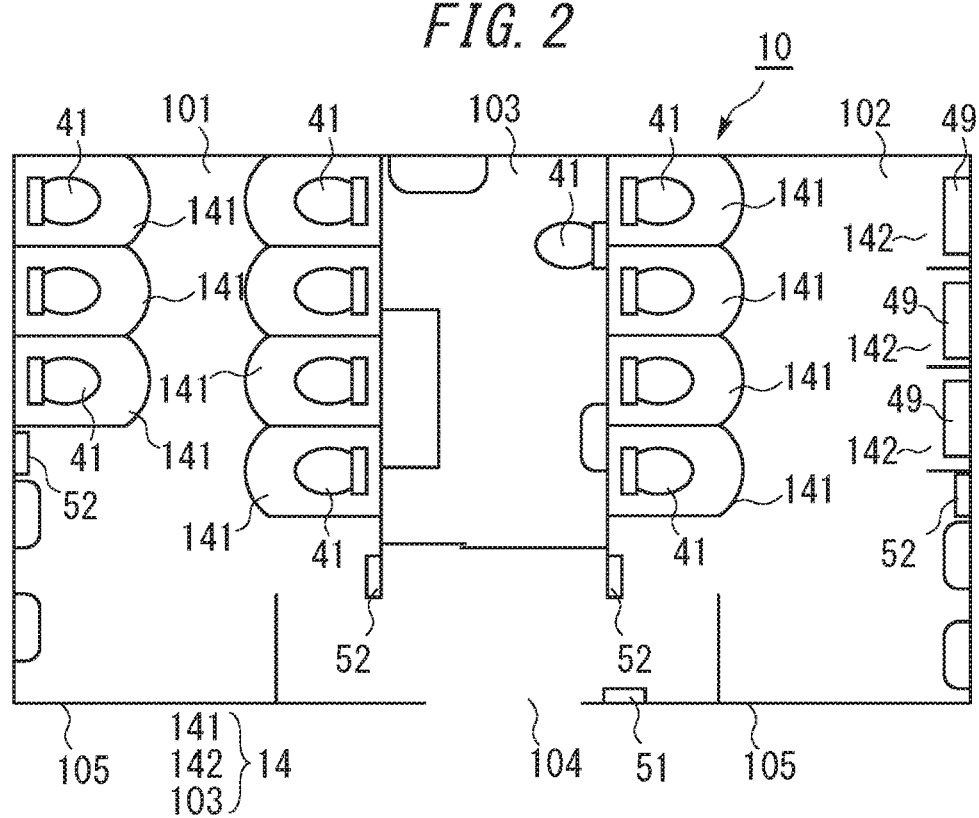
FIG. 2 illustrates an example of a toilet facility.

FIG. 2 illustrates an example of the toilet facility 10. As illustrated in FIG. 2, the toilet facility 10 is segmented into, for example, a female toilet facility 101, a male toilet facility 102, and a multi-use toilet facility 103. The toilet facility 10 is enclosed with faces of wall 105, except an entrance 104. That is, a user who uses the toilet facility 10 enters and exits the toilet facility 10 through the entrance 104. Note that the entrance 104 is provided not only at a single place, but the entrances 104 may be provided at a plurality of places. When an abnormality is detected, the control apparatus 44 of each toilet booth 14 notifies the abnormality to the management server 2. The female toilet facility 101 includes a plurality of toilet booths 141, each provided with a toilet bowl 41, and the male toilet facility 102 includes a plurality of the toilet booths 141, each provided with the toilet bowl 41, and a plurality of toilet booths 142, each provided with a urinal 49. The multi-use toilet facility 103 in FIG. 2 is a single toilet booth including an ostomy amenity and a baby bed, in addition to the toilet bowl 41. The multi-use toilet facility 103 is not limited to this, but may include a plurality of toilet booths. As described above, the toilet facility 10 according to the present embodiment includes, as the toilet booths 14, the toilet booths 141, each provided with the toilet bowl 41, the toilet booths 142, each provided with the urinal 49, and the multi-use toilet facility 103. Here, each toilet booth 14 is a space (cubicle) that is enclosed with a door, walls, and the like and is provided with toilet amenities 1 such as the toilet bowl 41, 49 for allowing a user to relieve nature in a solo state when the user uses the toilet booth 14. Note that each toilet booth 14 is not strictly limited to being used by a solo user but may allow a helper, a baby, or a toddler to come in together with a user at the same time. Each toilet booth 14 may be a space that is not completely enclosed, such as a space provided with a toddler toilet or a space provided with the urinal 49.

Figure 3:
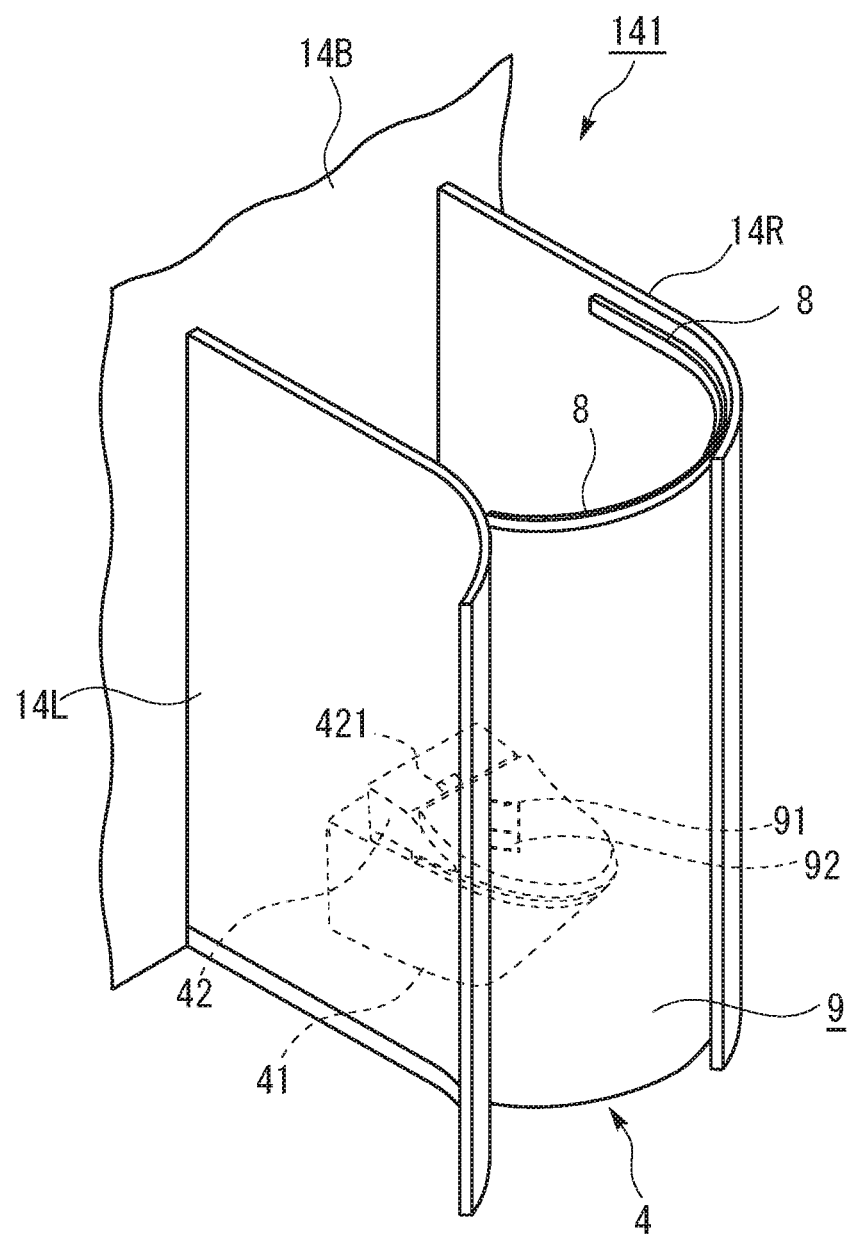
FIG. 3 is a perspective view illustrating a toilet booth.
Figure 4:
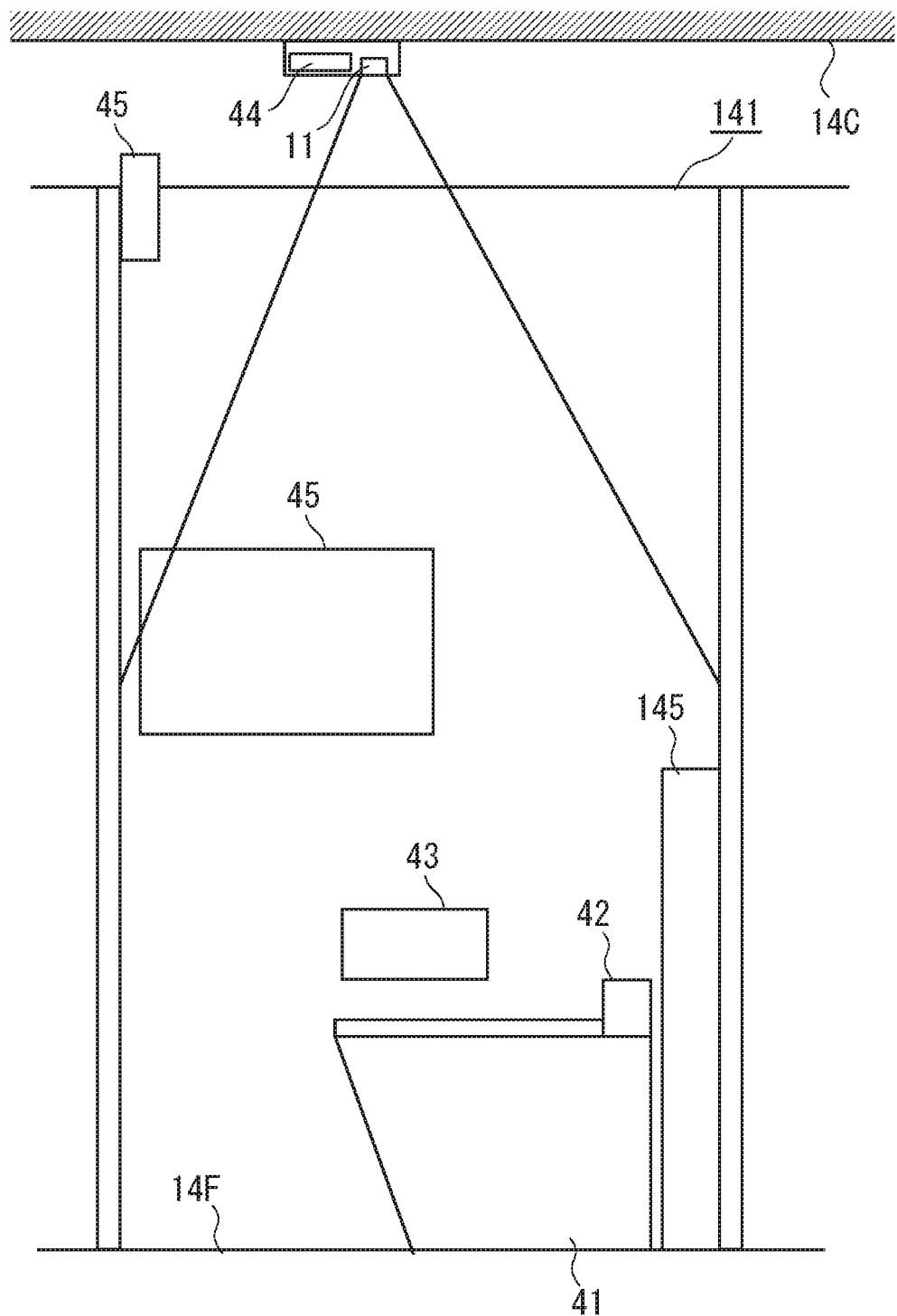
FIG. 4 is a front view illustrating the toilet booth.

FIG. 3 is a perspective view illustrating an example of one of the toilet booths 141 provided with the toilet bowl 41, and FIG. 4 is a front view illustrating the toilet booth 141. The toilet booth 141 is enclosed with a pair of left and right side walls 14L and 14R and a back wall 14B on three sides and, on a front, has a door 9 that opens and closes an entrance 4 of the toilet booth 141. The toilet bowl 41 is installed within the toilet booth 141 enclosed with the side walls 14L and 14R, the back wall 14B, and the door 9. The walls 14L, 14R, and 14B and the door 9 enclosing the toilet booth 141 may have a height extending from a floor 14F to a ceiling 14C, but in the present embodiment, a space is provided between the ceiling 14C and each of the left and right side walls 14L and 14R and the door 9 as illustrated in FIG. 4, to allow air to circulate.

Here, left and right refer to a left side and a right side when the entrance 4 is squarely faced from outside of the toilet booth 141, respectively, front and back refer to a front side and a back side when a user sits on the toilet bowl 41, respectively, and upper and lower refers to a ceiling 14C side (upper side) and a toilet bowl 41 installation face (floor) 14F side (lower side), respectively.

The left and right side walls 14L and 14R are boards, which are straight-line shaped on a back-end side and are curved leftward on a front-end side so that a transverse section (horizontal section) is J-shaped (see FIGS. 2 and 3). If the toilet booth 141 has adjacent toilet booths 141, the left side wall 14L concurrently serves as the right side wall 14R of one of the other toilet booths 141 on the left, and the right side wall 14R concurrently serves as the left side wall 14L of one of the other toilet booths 141 on the right.

One end of a guide rail 8 is provided on an inner upper portion of the right side wall 14R (see FIG. 3). The guide rail 8, the one end of which is supported by the right side wall 14R, passes over the entrance 4, and the other end of the guide rail 8 is fixed to the left side wall 14L. Note that the guide rail 8 is also provided on a toilet-booth inner side of the left side wall 14L, which concurrently serves as the right side wall of the adjacent toilet booth 141 on the left, depiction of which is omitted in FIG. 3. The door 9 is installed in a state being suspended from the guide rail 8, and the entrance 4 is opened and closed by moving the door 9 along the guide rail 8. Note that although the present embodiment illustrates an example in which the door 9 is curved and slid along the guide rail 8, the shape is not limited to this. The front face including the left and right side walls and the door may be made to be flat so that the shape of a horizontal section (the shape of a plane) of the toilet booth 141 is rectangular.

A lock 91 is provided on a left end portion of the door 9 to allow a user located within the toilet booth to perform locking and unlocking operations. When locked, the lock 91 engages with a catch (not illustrated) on the left side wall 14L and prevents the door opening. The lock 91 is not limited to the configuration that engages with the left side wall 14L, but only needs to keep closing the door 9. The lock 91 may have a configuration that engages with the right side wall 14R, or a configuration that engages with any other one of the guide rail 8, the floor 14F, and the ceiling 14C and is locked. Note that the lock 91 may be omitted if the door 9 is automatically opened and closed and if a configuration is made such that the door 9 is not operated to open before a user instructs to open the door. The door 9 includes an opening/closing sensor (door sensor) 92 that detects whether or not the lock 91 is locked, and whether the door 9 is opened or is closed.

As illustrated in FIGS. 3 and 4, each toilet booth 141 includes the toilet amenities 1 such as the toilet bowl 41, a toilet seat apparatus 42, and a controller 43, the image pickup apparatus 11, a display apparatus 13, the control apparatus 44, and the alarm unit 45.

The image pickup apparatus 11 is provided on the ceiling 14C of the toilet booth 141 and shoots a bird's-eye view of the inside of the toilet booth from the ceiling side. In the present example, a configuration is made such that the single image pickup apparatus 11 is provided on the ceiling 14C, but is not limited to this. A plurality of image pickup apparatuses 11 may be provided in each toilet booth 141. In such a case, the plurality of image pickup apparatuses 11 may be configured to pick up images of different areas, respectively, or the plurality of image pickup apparatuses 11 may be configured to pick up images of the same area from different angles.

The toilet seat apparatus 42 is provided on the Western-style toilet bowl 41 and has a function of warming a seat on which a user sits and a cleaning function of ejecting warm water and cleaning an anus and a genital of a user. The toilet seat apparatus 42 includes a sitting sensor 420 that detects whether or not a user is sitting on the seat and, based on a result of the detection by the sitting sensor 420, performs control of enabling/disabling ejection so that warm water is ejected when a warm water ejection button (not illustrated) is pressed while the user is sitting on the seat, but warm water is not ejected even when the warm water ejection button (not illustrated) is pressed while the user is not sitting on the seat. Based on the result of the detection by the sitting sensor 420, the toilet seat apparatus 42 performs control of shifting to a power saving mode by lowering temperature of the seat when a user does not sit on the seat, and the like. A style of the toilet bowl 41 is not limited to the Western style, but may be a Japanese style. If the Japanese-style toilet bowl 41 is provided, the toilet seat apparatus 42 is omitted.

Figure 5:
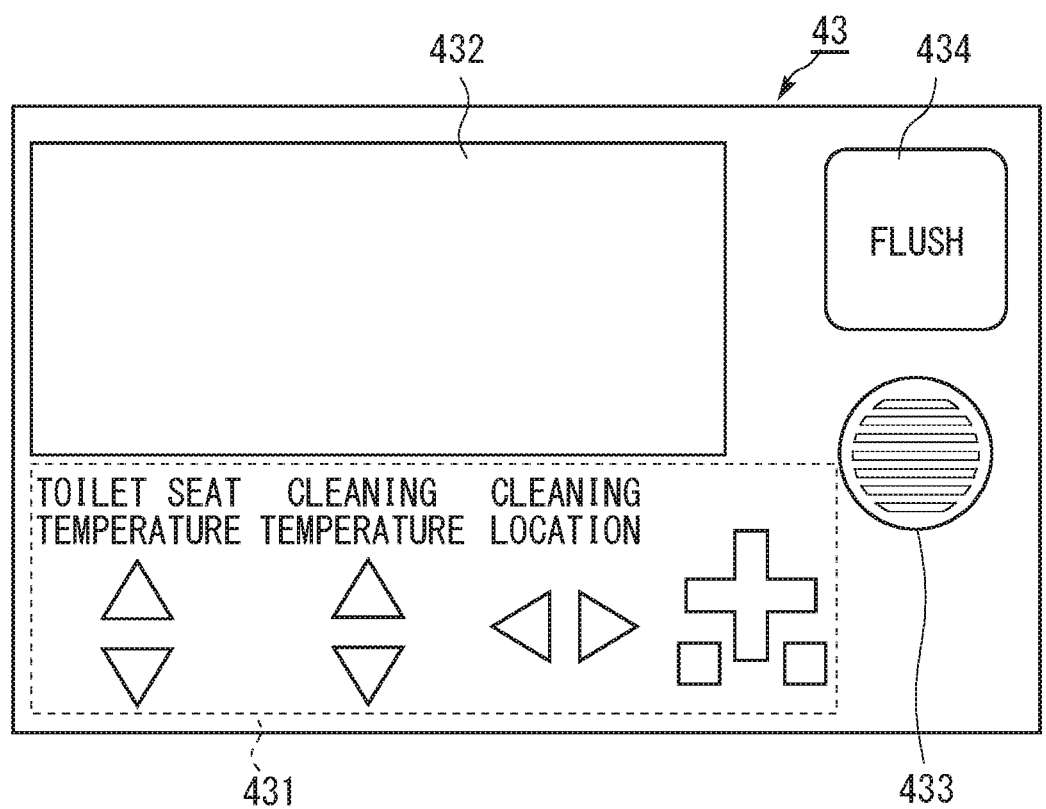
FIG. 5 illustrates an example of a controller.

The controller 43 includes an operation unit 431 on which a temperature setting, a cleaning location setting, and the like of the toilet seat apparatus 42 is operated, as illustrated in FIG. 5. The controller 43 also includes a display unit 432, a speaker 433, and a cleaning button 434. In addition, the controller 43 may also include buttons to input a use state (not illustrated) such as an emergency button, a fire alarm button, and a no abnormality button. The buttons may be so-called software keys that are displayed on the display unit 432 and selected by using a touch sensor or the operation unit 431.

The display unit 432 displays a set temperature of the toilet seat, a temperature of the warm water for cleaning, and a cleaning location, and also displays information received from the control apparatus 44, and the like.

The speaker 433 outputs an operation sound when the operation unit 431 is operated, a sound related to an alarm, which will be described later, an imitative sound imitating a sound of cleaning water flushing the toilet bowl, and the like.

The cleaning button 434 is an operation button that is operated by a user when cleaning water is released to the toilet bowl 41. When the controller 43 detects that the cleaning button 434 is pressed, the controller 43 opens a flush valve (not illustrated) of the toilet bowl 41 and releases the cleaning water.

The alarm unit 45 is provided, for example, above the left, right side wall 14L, 14R in such a manner that a display unit 451 that displays light or a message as an alarm and a speaker 452 that outputs a sound as an alarm are directed to an outside of the toilet booth 141. That is, a configuration is made such that an alarm is informed not only to a user within the toilet booth but also to people around through a space between the side wall 14L, 14R and the ceiling 14C to let the people around know which toilet booth issues an alarm.

The display apparatus 13 is provided on an inner wall of the toilet booth and serves as a digital signage displaying image information such as an advertisement and a building guide. The display apparatus 13 may be configured to output sound accompanying the image information by including a speaker.

Figure 6:
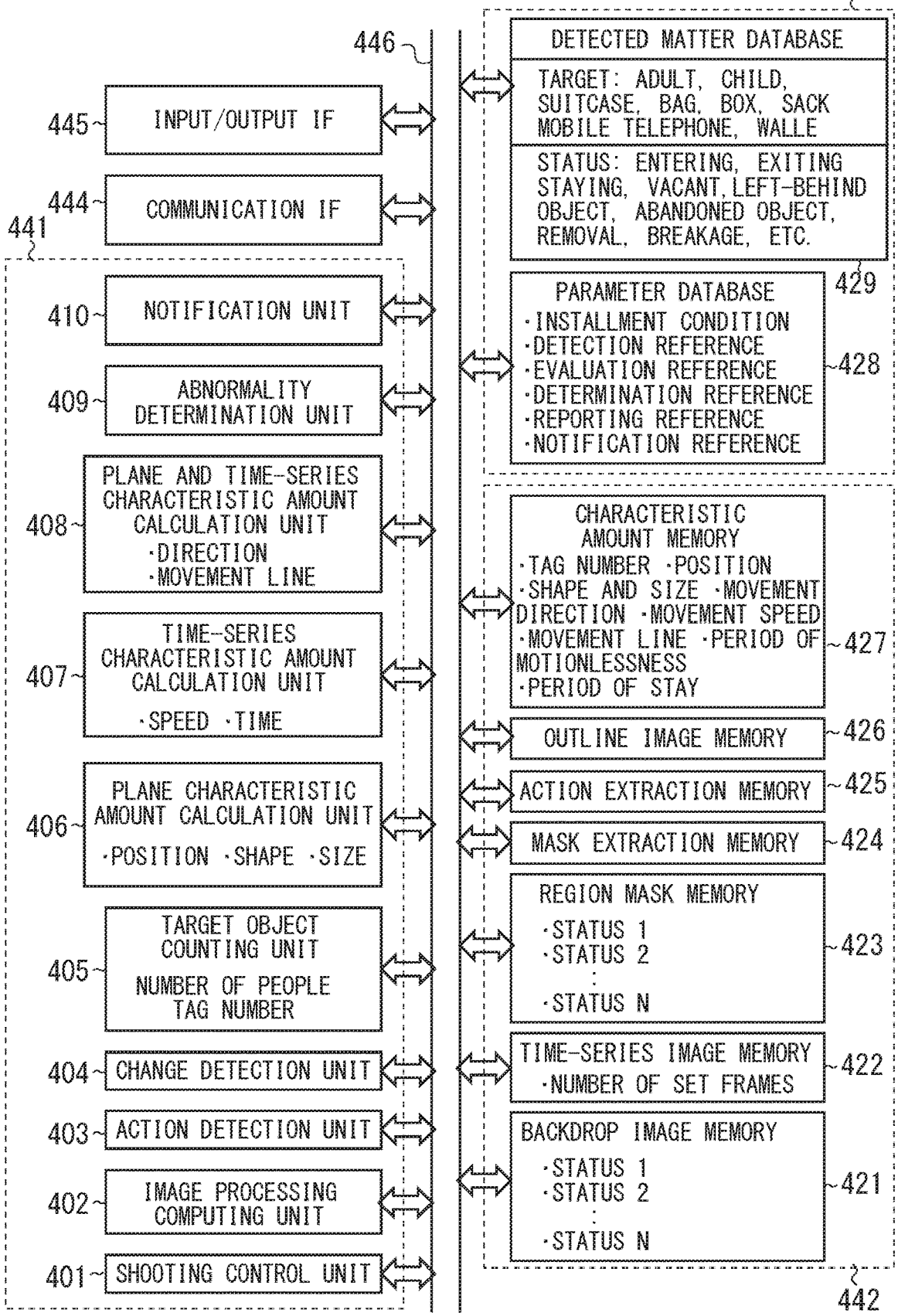
FIG. 6 illustrates a configuration of a control apparatus.

The control apparatus 44 is electrically connected to the alarm unit 45, the controller 43, the toilet seat apparatus 42, the image pickup apparatus 11, the display apparatus 13, and the like and controls the alarm unit 45 and the controller 43 based on information detected by the image pickup apparatus 11. The control apparatus 44 is, for example, a computer including a CPU 441, a main memory 442, a communication IF (Interface) 444, an input/output IF (Interface) 445, and a communication bus 446 as illustrated in FIG. 6.

The main memory 442 is used for a cache of a program and data read by the CPU 441 and for a CPU work area. Specifically, the main memory 442 includes a RAM (Random Access Memory), a ROM (Read Only Memory), and the like. The main memory 442 also functions as a backdrop image memory 421, a time-series image memory 422, a region mask memory 423, a mask extraction memory 424, an action extraction memory 425, an outline image memory 426, and a characteristic amount memory 427.

The auxiliary memory 443 stores a program to be executed by the CPU 441, setting information, the condition table 471, and the like used in the present embodiment. Specifically, the auxiliary memory 443 includes an HDD or an SSD, a flash memory, and the like. The auxiliary memory 443 stores a parameter database 428 and a detected matter database 429.

The communication IF 444 transmits data to and receives data from another computer apparatus. Specifically, the communication IF 444 includes a wired or wireless network card and the like. The input/output IF 445 is connected to an input/output device, and receives an input from a user of the computer and outputs information to the user. The input/output IF 445 in the present embodiment is connected to the controller 43 as the input/output device, and receives an input through the operation unit 431, makes a display output to the display unit 432, and makes an audio output to the speaker. The constituent elements as mentioned above are connected through the communication bus 446. Note that any of the constituent elements may be provided in plural numbers, and part of the constituent elements do not need to be provided. For example, although the control apparatus 44 may be provided for each toilet booth 141, a configuration may be made such that the single control apparatus 44 is provided for two or more of the toilet booths 141, abnormalities in the two or more toilet booths 141 are detected by the single control apparatus and transmitted to the management server 2, and an alarm is notified by the single control apparatus 44 to the controller 43 or the alarm unit 45 of each toilet booth 141.

The CPU 441 is also referred to as MPU (Micro Processor Unit), microprocessor, or processor. The CPU 441 is not limited to a single processor, but may have a multi-processor configuration. The single CPU 441 connected using a single socket may have a multi-core configuration. Processing by at least part of the units may be performed by any other processor than the CPU 441, for example, by a dedicated processor such as a Digital Signal Processor (DSP), a Graphics Processing Unit (GPU), a math processor, a vector processor, or an image processing processor. Processing by at least part of the units may be implemented as an integrated circuit (IC), or any other digital circuit. At least part of the units may include an analog circuit. Integrated circuits include an LSI, an Application Specific Integrated Circuit (ASIC), and a Programmable Logic Device (PLD). PLDs include, for example, a Field-Programmable Gate Array (FPGA). The units may be a combination of a processor and an integrated circuit. Such a combination is referred to as, for example, MCU (Micro Controller Unit), SoC (System-on-a-chip), system LSI, chipset, or the like. The CPU 441 also functions as a shooting control unit 401, an image processing computing unit 402, an action detection unit 403, a change detection unit 404, a target object counting unit 405, a plane characteristic amount calculation unit 406, a time-series characteristic amount calculation unit 407, a plane and time-series characteristic amount calculation unit 408, an abnormality determination unit 409, and a notification unit 410 by executing computational processing in accordance with a program.

The shooting control unit 401 controls the image pickup apparatus 11 such that an image picked up by the image pickup apparatus 11 is stored in the memory. The image processing computing unit 402 performs preprocessing on an image, such as grayscale conversion, binarization, and resizing, masking processing, generation of an outline image, and the like. The image processing computing unit 402 in the present example is an embodiment of a notification data generation unit that generates an outline image (notification data) from a picked-up image based on a result of abnormality determination, which will be described later. The action detection unit 403 detects an action of an object that is imaged in a picked-up image. The change detection unit 404 detects a change in an object that is imaged in a picked-up image. The target object counting unit 405 counts the number of target objects such as a user entering the booth and a left-behind object. The plane characteristic amount calculation unit 406 detects characteristic amounts such as a position, a shape, and a size of each object that is imaged in a picked-up image, and identifies, for example, an object that matches with human characteristics as a user. The time-series characteristic amount calculation unit 407 detects characteristic amounts such as a speed and a time period related to an imaged object, from picked-up images picked up in a time series. The plane and time-series characteristic amount calculation unit 408 detects characteristic amounts such as a direction and a movement line of an imaged object, from picked-up images picked up in a time series. The abnormality determination unit 409 determines an abnormality in the toilet booth 14, with respect to a picked-up image picked up by the image pickup apparatus, based on the characteristic amounts and the like obtained by the action detection unit 403, the change detection unit 404, the target object counting unit 405, the plane characteristic amount calculation unit 406, the time-series characteristic amount calculation unit 407, and the plane and time-series characteristic amount calculation unit 408. The notification unit (abnormality notification unit) 410 notifies, when it is determined that an abnormality occurs, the abnormality to predetermined notification destinations such as the management server, the manager terminal, and the alarm unit 45. When a left-behind object is detected, the notification unit 410 may cause the alarm unit 45 or the speaker of the controller to output an audio message such as "Something is left" to a user.

<Security Management Method>

Figure 7:
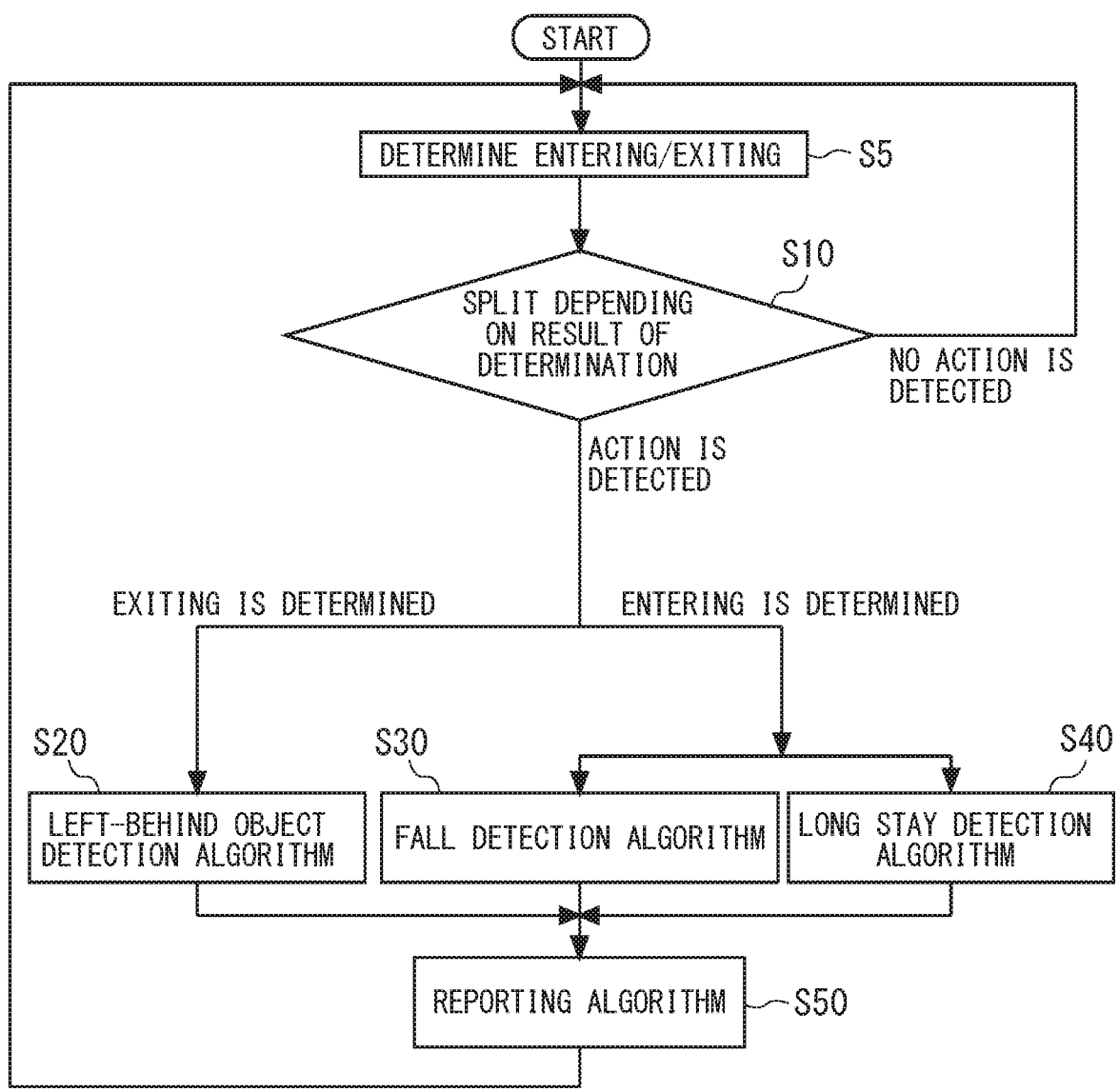
FIG. 7 illustrates a flow of entire processing in which an abnormality is detected and an alarm is issued.

FIG. 7 illustrates processing in which an abnormality is detected and an alarm is issued by the control apparatus 44 of each toilet booth 14. First, the control apparatus 44 determines entering/exiting of a user, based on a picked-up image picked up by the image pickup apparatus 11 (step S5). Note that details of processing of determining entering/exiting will be described later.

The control apparatus 44 selects (splits) processing, depending on a result of determination in step S5 (step S10). When the result of determination is exiting, the control apparatus 44 starts a left-behind object detection algorithm (step S20). On the other hand, when the result of determination is entering or staying, the control apparatus 44 executes a fall detection algorithm (step S30) and a long stay detection algorithm (step S40) in parallel.

The control apparatus 44 then executes a reporting algorithm (step S50) and notifies a result of detection through the left-behind object detection algorithm, the fall detection algorithm, and the long stay detection algorithm to the predetermined notification destinations such as the management server 2, the manager terminal 3, and the alarm unit 45.

Figure 8:
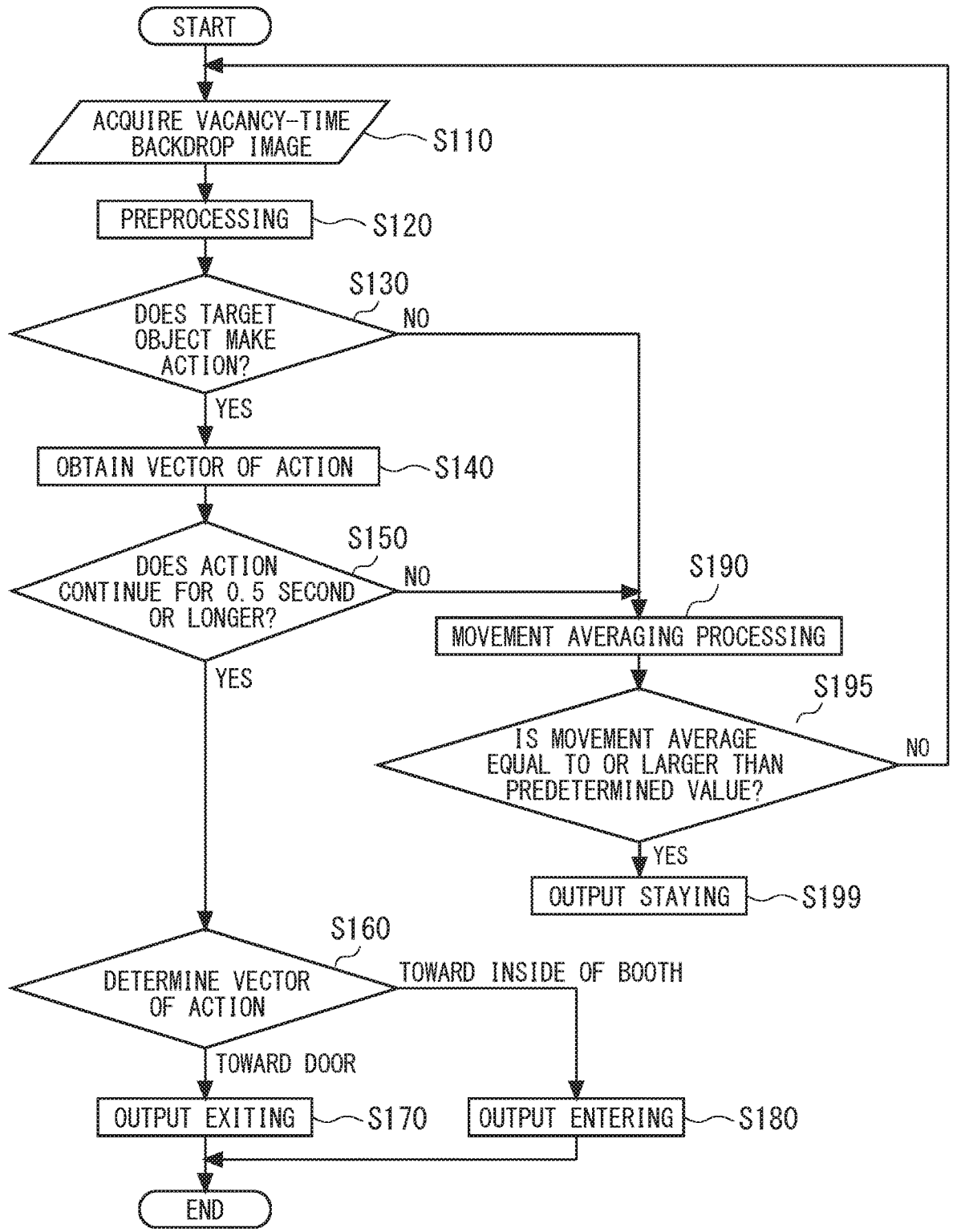
FIG. 8 illustrates details of processing of determining entering/exiting.

FIG. 8 illustrates details of the processing of determining entering/exiting (step S5) in FIG. 7. The control apparatus 44 acquires from the backdrop image memory 421 an image picked up at time of vacancy (vacancy-time backdrop image) (step S110). The control apparatus 44 acquires picked-up images picked up by the image pickup apparatus 11 in a time series and performs preprocessing such as processing of extracting, from the picked-up images acquired in a time series (hereinafter, also referred to as time-series images), a difference from the backdrop image and binarization processing (step S120).

Next, the control apparatus 44 determines whether or not an action is made in the picked-up images subjected to the preprocessing (step S130). Note that in step S130, in order to detect entering/exiting of a user, an influence of noise due to ambient light or the like may be eliminated in such a manner that the plane characteristic amount calculation unit 406 extracts an object having characteristics such as a size and a shape that are applicable to a human, and it is determined that an action is made when the object having such human characteristics moves, but it is determined that no action is made when an object having a size and a shape that are not characteristic of a human moves.

When positive determination is made in step S130, the control apparatus 44 obtains a vector of the action from the picked-up images (step S140). The control apparatus 44 determines whether or not the action continues for a predetermined time period (0.5 second in the present example) or longer (step S150). When positive determination is made here, the control apparatus 44 determines whether the vector of the action is toward an inside of the booth or toward the door, that is, the exit (step S160). When the vector of the action goes from the inside of the booth toward the exit, the control apparatus 44 determines exiting of a user and outputs a result of determination (a flag, a control signal, or the like) indicating exiting (step S170). When the vector of the action comes from the door toward the inside of the booth, the control apparatus 44 determines entering of a user and outputs a result of determination indicating entering (step S180).

On the other hand, when negative determination is made in step S130, S150, the control apparatus 44 calculates a movement average of an object that is imaged in the time-series images (step S190), and determines whether or not the movement average is equal to or larger than a predetermined value (step S195). When the movement average is smaller than the predetermined value (step S195, No), the control apparatus 44 determines that no action is made, that is, no user exists, and returns to step S110.

In step S195, when the movement average is equal to or larger than the predetermined value (step S195, Yes), the control apparatus 44 determines that a user stays in the booth, such as the user being sitting, although the action is not a continuous action like entering or exiting, and outputs a result of determination indicating staying (step S199).

Figure 9:
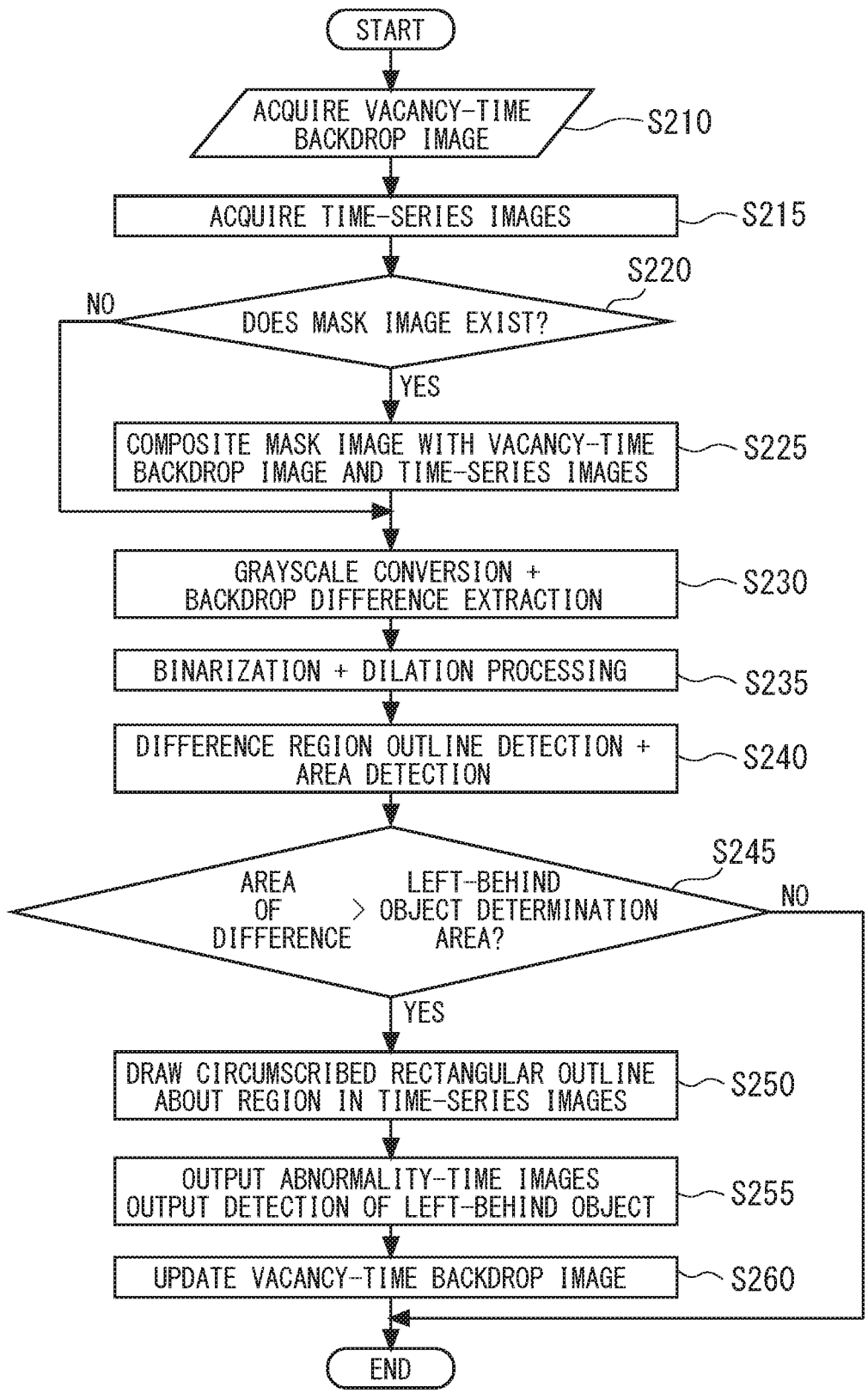
FIG. 9 illustrates details of a left-behind object detection algorithm.

FIG. 9 illustrates details of the left-behind object detection algorithm (step S20) in FIG. 7. The control apparatus 44 acquires an image picked up before entering of the user (vacancy-time backdrop image) from the backdrop image memory 421 (step S210). The control apparatus 44 acquires picked-up images picked up by the image pickup apparatus 11 in a time series (step S215).

Next, the control apparatus 44 determines whether or not a mask image exists (step S220) and, when positive determination is made, composites the mask image with the vacancy-time backdrop image and the time-series images (step S225). When negative determination is made in step S220, the control apparatus 44 skips step S225 and moves to step S230.

In step S230, the control apparatus 44 performs grayscale conversion on the vacancy-time backdrop image and the time-series images and extracts a difference between the vacancy-time backdrop image and the time-series images. For example, when the user leaves an object behind in the toilet booth, the left-behind object is extracted as a difference in step S230 because the left-behind object does not appear in the vacancy-time backdrop image picked up before entering of the user of whom exiting is determined, and the left-behind object appears in the time-series images after exiting of the user.

Figure 10:
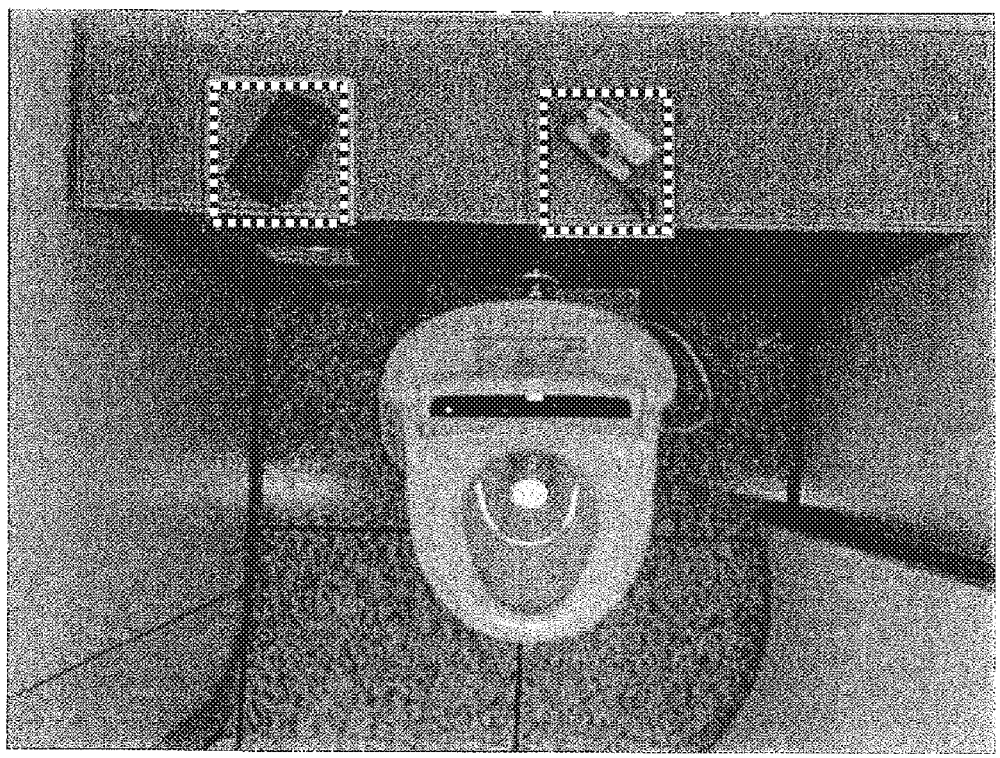
FIG. 10 is an example of an image in which left-behind objects are marked with frames (markers).

The control apparatus 44 performs binarization on the difference images and dilation processing (step S235) to extract an outline of a difference region, and obtains an area within the outline, that is, an area of the difference region (step S240). When the area of the difference region is not larger than a threshold value (left-behind object determination area) (step S245, No), the control apparatus 44 terminates the processing in FIG. 9. When the area of the difference region is larger than the threshold value (step S245, Yes), the control apparatus 44 determines that the difference region is a left-behind object and draws a rectangular frame, as a marker indicating the left-behind object, at a location where the outline is enclosed with the frame, that is, a location where the outline is circumscribed with the frame in the present example, in the time-series images (step S250). FIG. 10 is an example of an image in which detected left-behind objects are marked with frames (markers).

The control apparatus 44 then outputs the time-series images in which the frame enclosing the left-behind object is added as a result of detection of the left-behind object (step S255), and updates the vacancy-time backdrop image by registering an image picked up after exiting of the user in the backdrop image memory 421 (step S260).

Note that regardless of the present example in which entering/exiting of a user is detected based on an action of the user, it may be determined whether a door of a toilet in picked-up images is in an opened state or in a closed state, and entering may be determined when the door changes from the opened state to the closed state, exiting may be determined when the door changes from the closed state to the opened state, and staying may be determined when the door is in the closed state until the door changes to the opened state.

Figure 11:
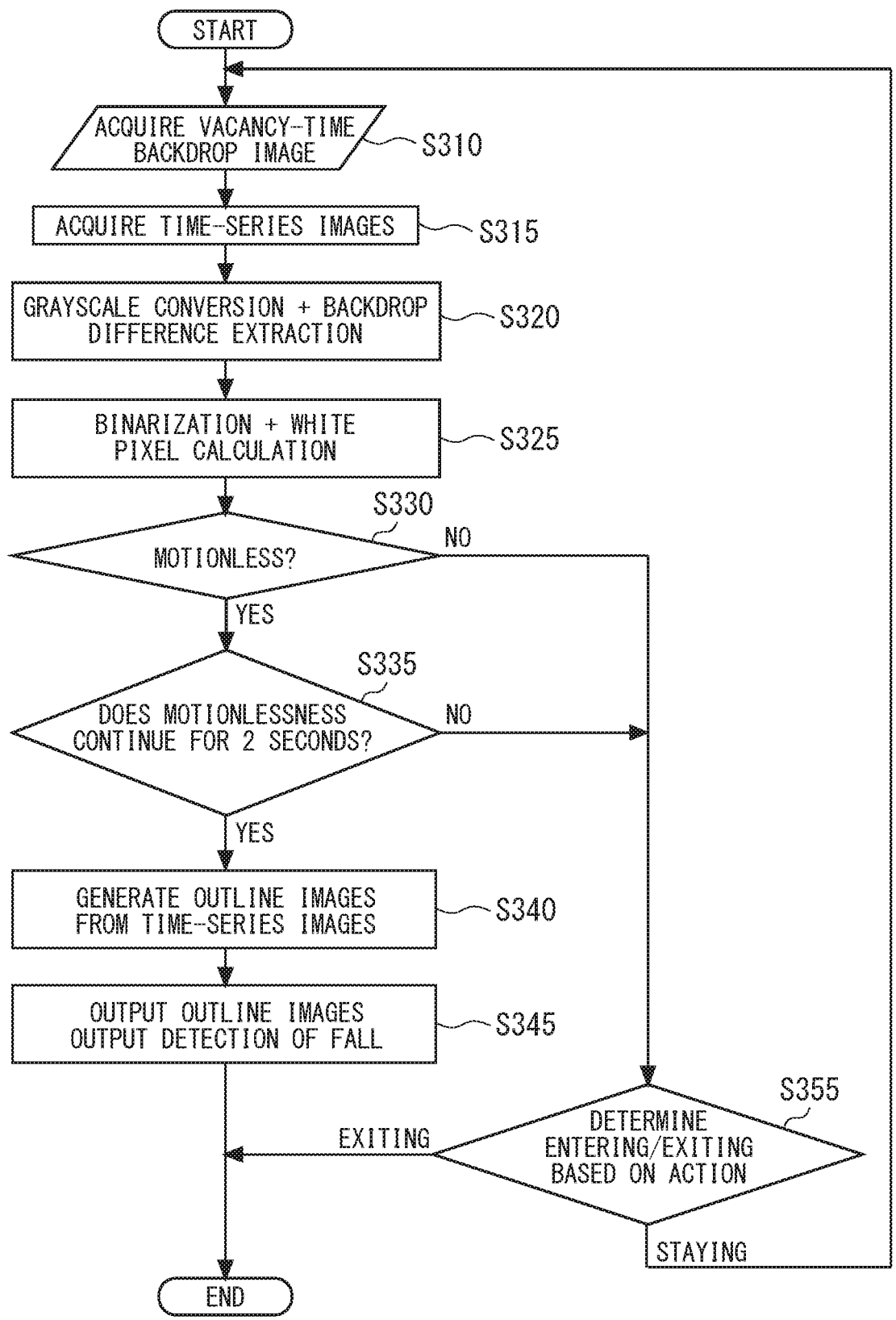
FIG. 11 illustrates details of a fall detection algorithm.

FIG. 11 illustrates details of the fall detection algorithm (step S30) in FIG. 7. The control apparatus 44 acquires an image picked up before entering of the user (vacancy-time backdrop image) from the backdrop image memory 421 (step S310). The control apparatus 44 acquires picked-up images picked up by the image pickup apparatus 11 in a time series (step S315).

Next, the control apparatus 44 performs grayscale conversion on the vacancy-time backdrop image and the time-series images and extracts a difference between the vacancy-time backdrop image and the time-series images (step S320). Thus, a user entering the booth and an article brought in by the user are detected as differences.

The control apparatus 44 performs binarization on difference images and obtains an action in the difference images, that is, an action of the user (step S325). For example, since pixels change in a time series at a portion where an action is made, the number of pixels (white pixels) changing in a time series is calculated. At the time, an influence of noise due to ambient light or the lime may be reduced in such a manner that the plane characteristic amount calculation unit 406 extracts a region having characteristics such as a size and a shape that are applicable to a human, and pixels of a region that does not have such human characteristics are excluded.

The control apparatus 44 determines whether or not the number of pixels obtained in step S325 is smaller than a predetermined value, that is, whether or not the user is motionless (step S330). When positive determination is made in step S330, the control apparatus 44 determines whether or not the positive determination continues for a predetermined time period (two seconds in the present example) set in the parameter database 428 or longer (step S335).

Figure 12:
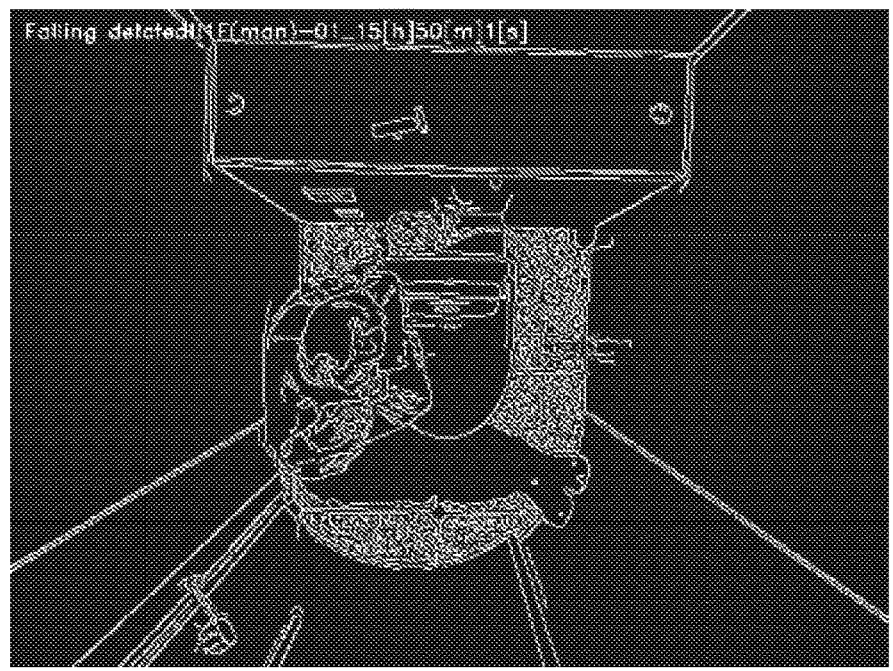
FIG. 12 is an example of an outline image.

When positive determination is made in step S335, since the user falls and is in an immobile state, the control apparatus 44 generates outline images by performing processing of extracting an outline from the time-series images (step S340). FIG. 12 is an example of the outline images. The control apparatus 44 then outputs a signal indicating occurrence of a fall and the outline images as a result of determination (step S345).

When negative determination is made in step S330, S335, the control apparatus 44 determines whether or not the user exits (step S355) as in FIG. 8, and terminates the processing in FIG. 11 when the user exits, but returns to step S310 when the user does not exit.

Figure 13:
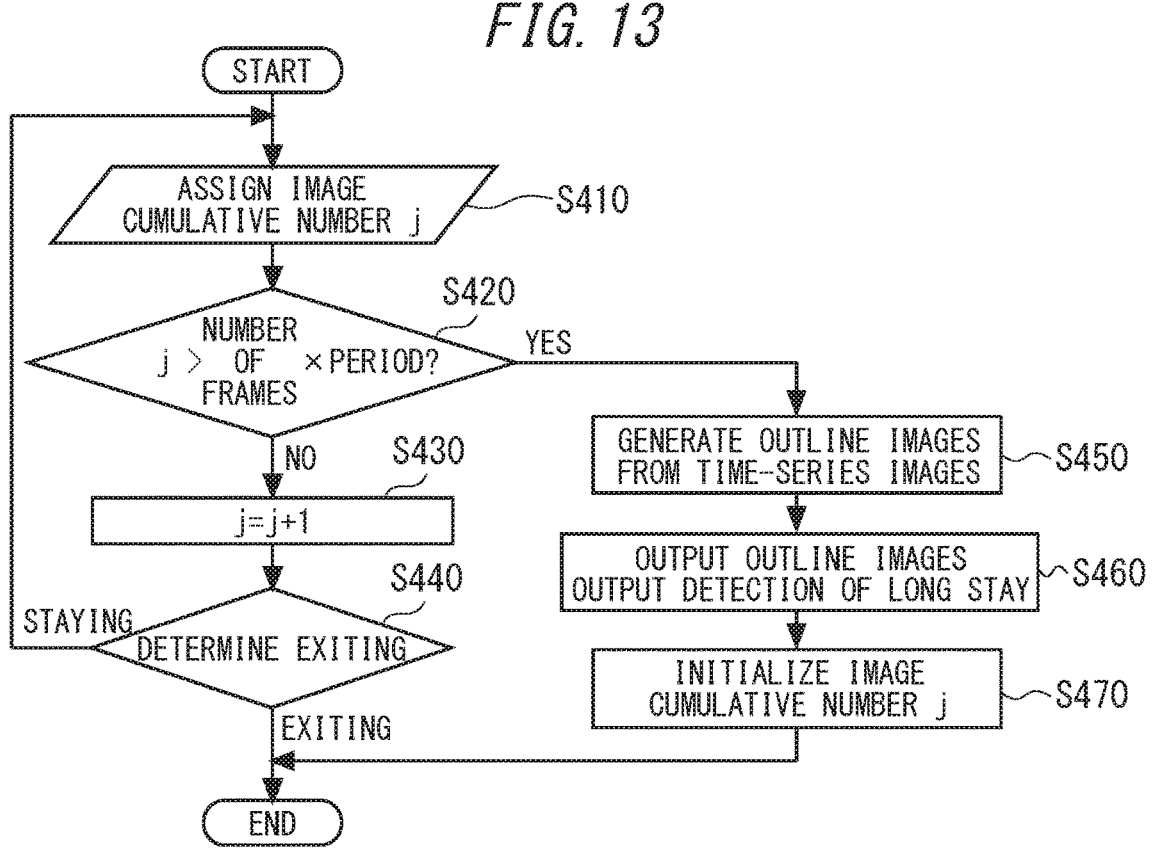
FIG. 13 illustrates details of a long stay detection algorithm.

FIG. 13 illustrates details of the long stay detection algorithm (step S40) in FIG. 7. The control apparatus 44 acquires the cumulative number of time-series images (the number of frames) picked up after entering of the user (step S410). The control apparatus 44 determines whether or not a time period of staying of the user exceeds a predetermined time period, depending on whether or not the cumulative number j of the time-series images (hereinafter, also referred to as image cumulative number j) is larger than a value obtained by multiplying a frame rate by the predetermined time period (step S420).

When negative determination is made in step S420, the control apparatus 44 increments the image cumulative number j (step S430), and determines whether or not the user exits (step S440) as in FIG. 8. The control apparatus 44 terminates the processing in FIG. 13 when the user exits in step S440, but returns to step S410 when the user stays in the booth.

On the other hand, when positive determination is made in step S420, the control apparatus 44 generates outline images by performing processing of extracting an outline from the time-series images (step S450). The control apparatus 44 then outputs a signal indicating a long stay of the user and the outline images as a result of determination (step S460), initializes the image cumulative number j (step S470), and terminates the processing in FIG. 13.

Figure 14:
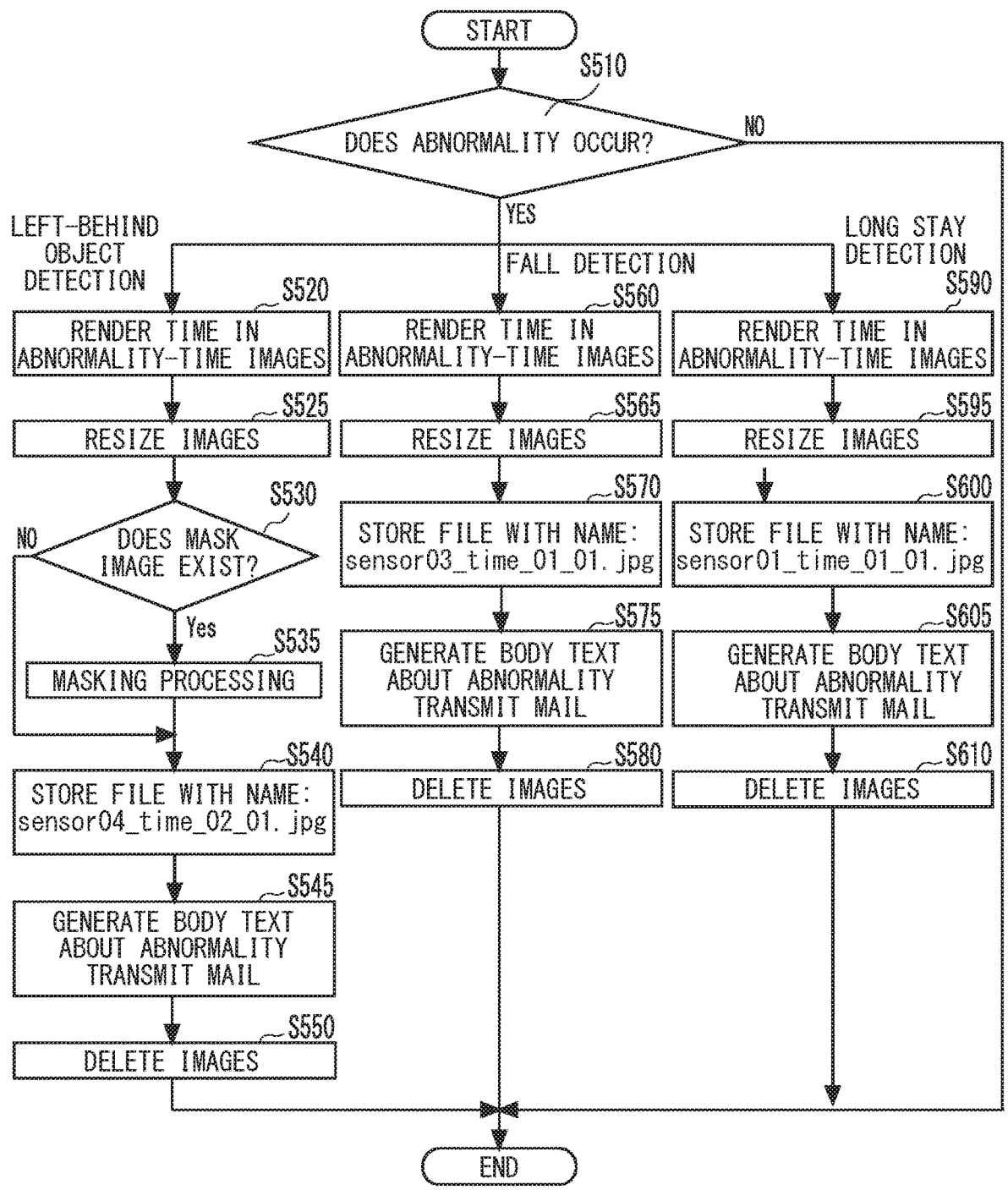
FIG. 14 illustrates details of a reporting algorithm.

FIG. 14 illustrates details of the reporting algorithm (step S50) in FIG. 7. First, the control apparatus 44 determines whether or not an abnormality occurs (step S510), and terminates the processing in FIG. 14 when negative determination is made, but performs processing in and after step S520 when positive determination is made.

When a left-behind object occurs, the control apparatus 44 renders a time period in the images outputted in step S255 (hereinafter, also referred to as abnormality-time images) (step S520) and converts a size of (resizes) the abnormality-time images to a predetermined size (step S525).

Next, the control apparatus 44 determines whether or not a mask image exists (step S530), and composites the mask image with the abnormality-time images (step S535) when positive determination is made, but skips step S535 and moves to step S540 when negative determination is made.

In step S540, the control apparatus 44 temporarily stores the abnormality-time images in a form of a file in the memory, reads from the main memory 442 a fixed phrase for notifying an abnormality indicating occurrence of a left-behind object to use for mail body text, attaches the file of the abnormality-time images to the mail body text, and transmits the mail body text with the file attached as an e-mail to a predetermined address, and also transmits abnormality notification information indicating occurrence of an abnormality to the alarm unit 45 (step S545). After transmission, the control apparatus 44 deletes the file and the time-series images used in abnormality determination from the memory (step S550).

When a fall occurs, the control apparatus 44 renders a time period in the images outputted in step S345 (hereinafter, also referred to as abnormality-time images) (step S560) and converts a size of (resizes) the abnormality-time images to a predetermined size (step S565).

Next, the control apparatus 44 temporarily stores the abnormality-time images in a form of a file in the memory (step S570), reads from the main memory 442 a fixed phrase for notifying an abnormality indicating occurrence of a fall to use for mail body text, attaches the file of the abnormality-time images to the mail body text, and transmits the mail body text with the file attached as an e-mail to a predetermined address (step S575). After transmission, the control apparatus 44 deletes the file and the time-series images used in abnormality determination from the memory (step S580).

When a long stay occurs, the control apparatus 44 renders a time period in the images outputted in step S460 (hereinafter, also referred to as abnormality-time images) (step S590) and converts a size of (resizes) the abnormality-time images to a predetermined size (step S595).

Next, the control apparatus 44 temporarily stores the abnormality-time images in a form of a file in the memory (step S600), reads from the main memory 442 a fixed phrase for notifying an abnormality indicating occurrence of a long stay to use for mail body text, attaches the file of the abnormality-time images to the mail body text, and transmits the mail body text with the file attached as an e-mail to a predetermined address, and also transmits abnormality notification information indicating occurrence of an abnormality to the alarm unit 45 (step S605). After transmission, the control apparatus 44 deletes the file and the time-series images used in abnormality determination from the memory (step S610).

<Effects of the Embodiment>

As described above, according to the security management apparatus according to the present embodiment, occurrence of an abnormality in a toilet booth can be detected based on picked-up images, and the occurrence of the abnormality can be notified to the manager and the management server. According to the security management apparatus according to the present embodiment, when a left-behind object occurs in a toilet booth, an image in which the detected left-behind object is marked with a frame is notified, whereby the manger can specifically recognize a status. When a fall or a long stay occurs, picked-up images are converted into outline images, which are then notified, whereby the manger can quickly learn occurrence of an abnormality, and at the same time privacy of a user can be ensured because a clear image of an inside of a toilet booth is not notified to the manger or the management server.

Second Embodiment

In the first embodiment, entering/exiting is determined based on an action of a user. However, in a second embodiment, an example will be illustrated in which entering/exiting of a user is determined by using a door sensor. Note that in the present embodiment, since other part than the processing related to entering/exiting is identical to the above-described embodiment, a description of the same components will be omitted.

Figure 15:
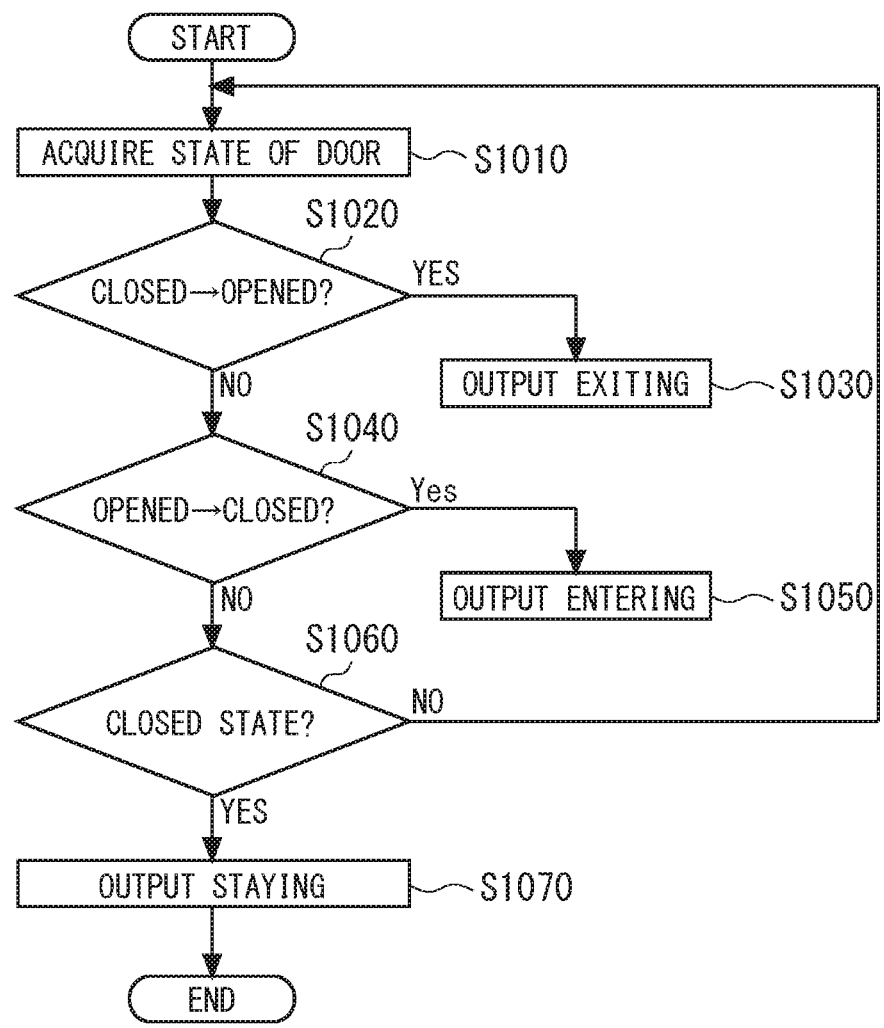
FIG. 15 illustrates processing of determining entering/exiting using a door sensor.

FIG. 15 illustrates processing of determining entering/exiting using a door sensor. The control apparatus 44 acquires a state of a door detected by a door sensor, for example, whether the door is in a closed state (or a locked state) or in an opened state, and stores the state of the door in the memory (step S1010).

The control apparatus 44 compares the latest state acquired in step S1010 with a state stored in the memory previously, or a predetermined time period earlier, and determines whether or not the door changes from the closed state to the opened state (step S1020).

When positive determination is made in step S1020, the control apparatus 44 determines exiting of a user and outputs a result of determination (a flag, a control signal, or the like) indicating exiting (step S1030).

When negative determination is made in step S1020, the control apparatus 44 compares the latest state acquired in step S1010 with the state stored in the memory previously, or a predetermined time period earlier, and determines whether or not the door changes from the opened state to the closed state (step S1040).

When positive determination is made in step S1040, the control apparatus 44 determines entering of a user and outputs a result of determination indicating entering (step S1050).

When negative determination is made in step S1040, the control apparatus 44 determines whether or not the state of the door acquired in step S1010 is the closed state (step S1060).

When positive determination is made in step S1060, the control apparatus 44 determines staying of a user and outputs a result of determination indicating staying (step S1070), but when negative determination is made, the control apparatus 44 returns to step S1010.

As described above, determination of entering/exiting of a user may be performed based on the door sensor.

Third Embodiment

In the present embodiment, an example of a security management method in a multi-use room will be illustrated. Note that in the present embodiment, since other part than a configuration in which a toilet booth is replaced with a multi-use room is identical to the above-described first embodiment, a description of the same components will be omitted.

Figure 16:
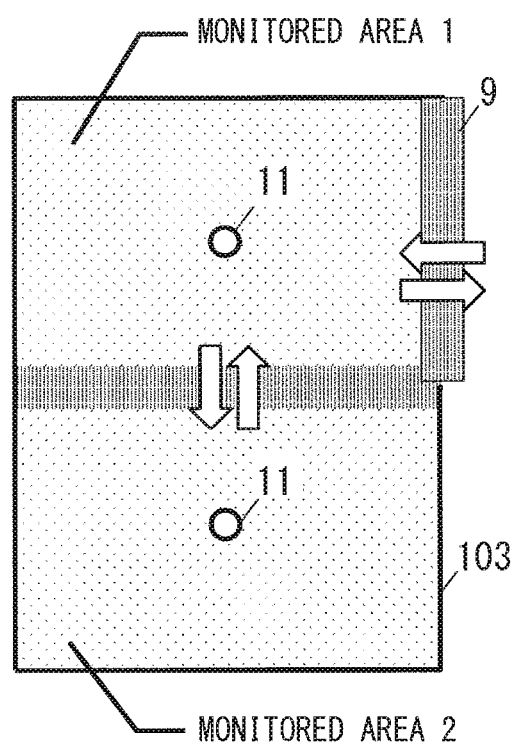
FIG. 16 is an explanatory diagram of a multi-use room.
Figure 17:
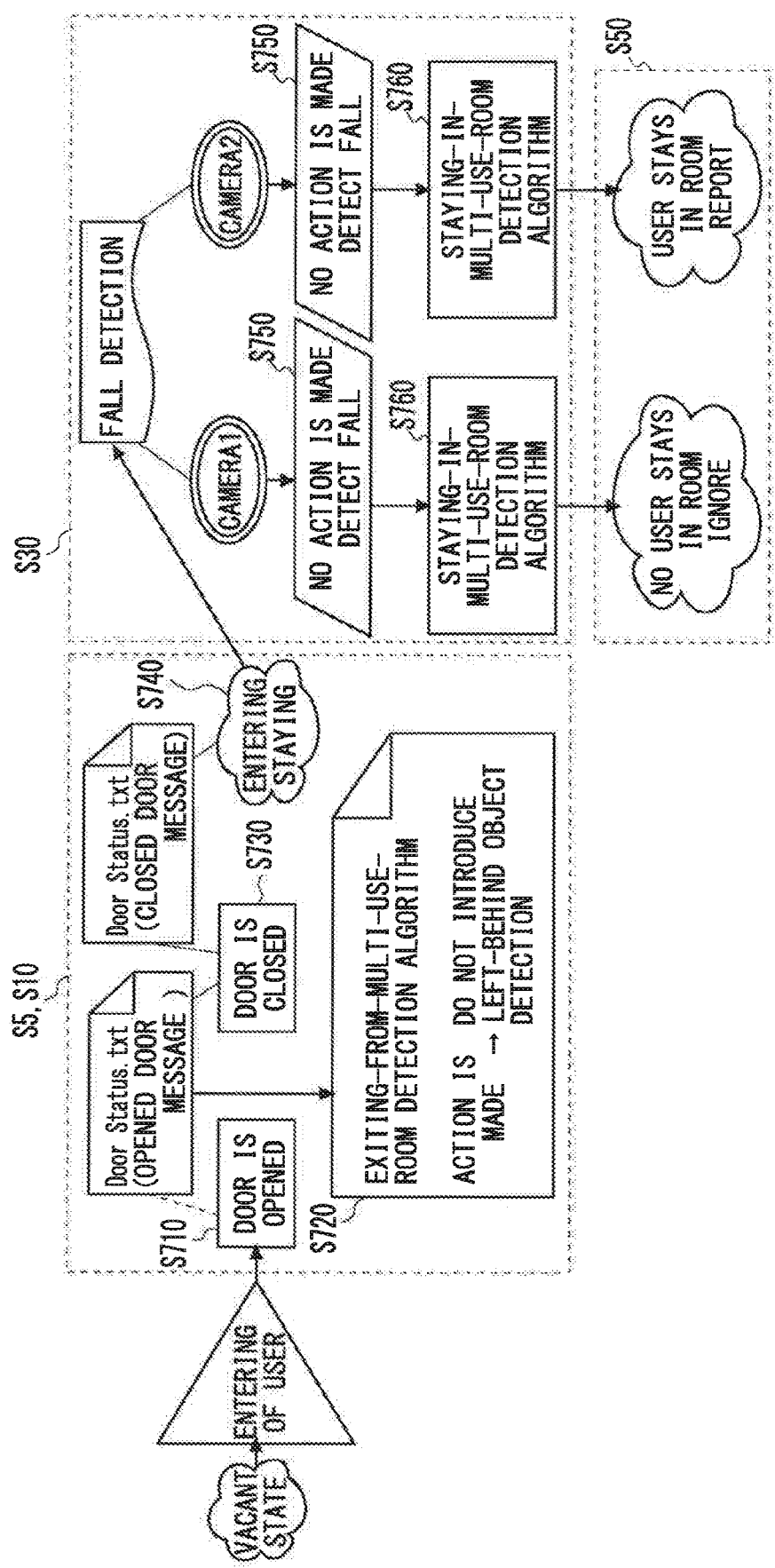
FIG. 17 illustrates processing performed at time of entering the multi-use room.
Figure 18:
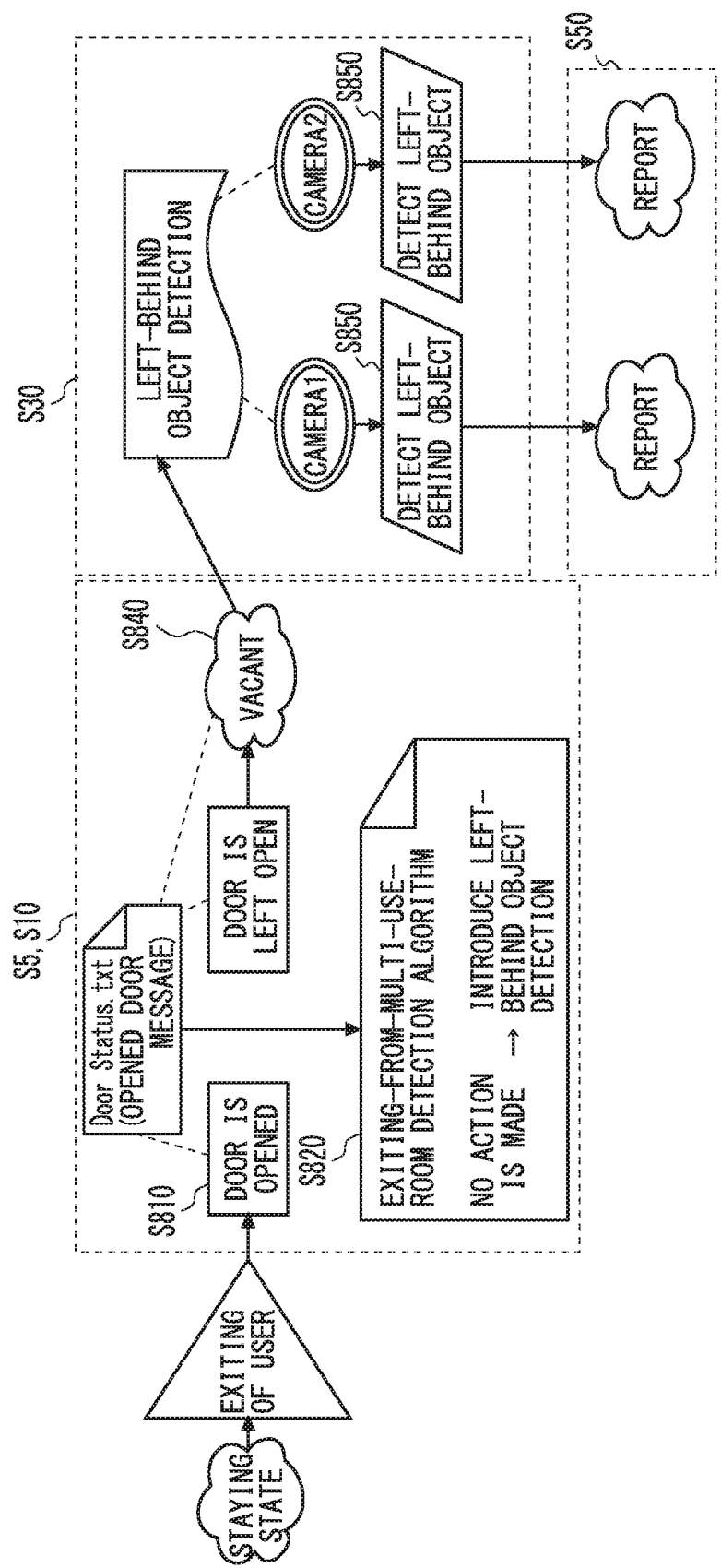
FIG. 18 illustrates processing performed at time of exiting the multi-use room.

FIG. 16 is an explanatory diagram of a multi-use room, FIG. 17 illustrates processing performed at time of entering the multi-use room, and FIG. 18 illustrates processing performed at time of exiting the multi-use room.

In the present embodiment, a plurality of (two in FIG. 16) image pickup apparatuses are installed in the multi-use room and detect an abnormality in a plurality of areas, respectively.

When a user opens a door when the user enters the room, a message indicating that the door is in an opened state is transmitted from a door sensor to the control apparatus 44. As illustrated in FIG. 17, the control apparatus 44 that has received the message (step S710) determines whether or not an action is made within the room (step S720) and, when an action is made here and when a message indicating that the door is in a closed state is received (step S730), determines entering of the user (step S740). Note that the processing of determining entering may be performed as in FIG. 8, FIG. 15.

The control apparatus 44 then performs the fall detection algorithm with respect to picked-up images acquired from the plurality of image pickup apparatuses 11 (step S750). When it is determined in step S750 that no action is made in all areas, it is determined that a fall occurs, but when an action is made in any one of the areas, it is determined that a fall does not occur. Note that when the user is not alone but is accompanied by a care attendant, a baby or an infant, or the like, that is, a plurality of users enter the room, determination is performed for each of the plurality of users. For example, the number of people entering the multi-use room is counted, and it is determined whether or not as many actions as the number of the people are made. In other words, when the number of target objects that are making actions is smaller than the number of the people entering the room, occurrence of a fall is determined. It may be determined for each user whether or not an action is made, by identifying and assigning a tag (identification information) to each user entering the room, and tracing respective movements from entering until exiting to recognize which user is in which area. The processing of determining entering in steps S710 to S740 in FIG. 17 corresponds to step S10 in FIG. 7, and step S750 corresponds to step S30. Note that although FIG. 17 illustrates an example in which fall detection is performed when a user enters the room, long stay detection can also be performed in parallel with the fall detection.

When the user opens the door when the user exits the room, a message indicating that the door is in the opened state is transmitted from the door sensor to the control apparatus 44. As illustrated in FIG. 18, the control apparatus 44 that has received the message (step S810) determines whether or not an action is made within the room (step S820) and, when no action is made or it is determined that the user moves to a door side, determines exiting of the user (step S840). Note that the processing of determining exiting may be performed as in FIG. 8, FIG. 15.

The control apparatus 44 then performs the left-behind object detection algorithm with respect to picked-up images acquired from the plurality of image pickup apparatuses 11 (step S850). When a left-behind object is detected in any one of the areas, it is determined that an abnormality occurs, but when no left-behind object is detected in all areas, it is determined that an abnormality does not occur. The processing of determining exiting in steps S810 to S840 in FIG. 18 corresponds to steps S5, S10 in FIG. 7, and step S850 corresponds to step S20. In other words, an entire flow in the present embodiment including: performing entering/exiting detection (step S10); performing the left-behind object detection algorithm (step S20), the fall detection algorithm (step S30), or the long stay detection algorithm (step S40) depending on an entering/exiting state; and making a report (step S50) when an abnormality occurs is also identical to the flow in FIG. 7.

As described above, according to the security management apparatus according to the present embodiment, occurrence of an abnormality in the multi-use room can also be detected based on picked-up images, and the occurrence of the abnormality can be notified to the manager and the management server. According to the security management apparatus according to the present embodiment, the plurality of image pickup apparatus are deployed in the multi-use room and perform abnormality detection in a plurality of areas, respectively, whereby abnormality detection can be performed with high accuracy.

<Others>

The present invention is not limited to the examples illustrated in the figures, and various changes can of course be made without departing from the scope of the present invention. For example, the matters described above may be used in combination. In the embodiments, an example is illustrated in which the toilet booths 14 are target booths. However, a target booth is not limited to this, and a target booth only needs to be a place that is not preferable for picking up an image when in use in order to ensure user privacy, such as a shower booth, a changeroom, a fitting room, and a capsule hotel room.

DESCRIPTION OF THE REFERENCE NUMERALS AND SYMBOLS

1: Toilet amenity
2: Management server
3: Manager terminal
4: Entrance/exit
5: Network
8: Guide rail
9: Door
10: Toilet facility
11: Image pickup apparatus
13: Display apparatus
14: Toilet booth
100: Security management system

What is claimed is:

1. A security management system comprising:
   an image pickup apparatus that picks up an image of an inside of a target booth; and
   a processor configured to implement an abnormality determination unit, a notification data generation unit, and an abnormality notification unit;
   wherein the abnormality determination unit determines an abnormality within the target booth, based on the picked-up image picked up by the image pickup apparatus;
   wherein the notification data generation unit generates notification data, based on a result of the determination of the abnormality;
   wherein the abnormality notification unit notifies the notification data;
   wherein the abnormality determination unit detects a user using the target booth and a left-behind object from the picked-up image;
   wherein the abnormality determination unit detects exiting of the user from the target booth responsive to the user moving toward an entrance in the target booth and entering of the user into the target booth responsive to the user moving from the entrance toward the inside of the target booth;
   wherein the abnormality determination unit determines the abnormality by comparing an image picked up before entering of the user with an image picked up after exiting of the user; and
   wherein responsive to the abnormality being detected, the notification data generation unit generates, via the processor, an image obtained by extracting an outline from the picked-up image as the notification data.

2. A security management method performed by a computer, the security management method comprising:
   picking up an image of an inside of a target booth by using an image pickup apparatus;
   detecting a user using the target booth and a left-behind object from the picked-up image;
   detecting exiting of the user from the target booth responsive to the user moving toward an entrance in the target booth and entering of the user into the target booth responsive to the user moving from the entrance toward the inside of the target booth;
   determining an abnormality within the target booth, based on the picked-up image picked up by using the image pickup apparatus, by comparing an image picked up before entering of the user with an image picked up after exiting of the user;
   generating notification data, responsive to the abnormality being detected, comprising an image obtained by extracting an outline from the picked-up image; and
   notifying the notification data.

\* \* \* \* \*